US012214321B2

(12) United States Patent
Muller et al.

(10) Patent No.: US 12,214,321 B2
(45) Date of Patent: Feb. 4, 2025

(54) DEVICES AND SYSTEMS FOR PREPARING A CHEMICAL SOLUTION

(71) Applicant: INNOVATIVE WATER CARE, LLC, Alpharetta, GA (US)

(72) Inventors: Matthew Muller, Cleveland, TN (US); Enloe West, Georgetown, TN (US)

(73) Assignee: INNOVATIVE WATER CARE, LLC, Alpharetta, GA (US)

( * ) Notice: Subject to any disclaimer, the term of this patent is extended or adjusted under 35 U.S.C. 154(b) by 48 days.

(21) Appl. No.: 18/332,156

(22) Filed: Jun. 9, 2023

(65) Prior Publication Data

US 2023/0405533 A1 Dec. 21, 2023

Related U.S. Application Data

(60) Provisional application No. 63/366,404, filed on Jun. 15, 2022.

(51) Int. Cl.
*B01F 21/20* (2022.01)
*B01F 23/50* (2022.01)
*B01F 101/00* (2022.01)

(52) U.S. Cl.
CPC .......... *B01F 21/221* (2022.01); *B01F 23/565* (2022.01); *B01F 2101/2204* (2022.01)

(58) Field of Classification Search
CPC ............................ B01F 21/221; B01F 23/565
See application file for complete search history.

(56) References Cited

U.S. PATENT DOCUMENTS 8,372,348 B2 * 2/2013 Adams .................... B01F 25/50 424/665
8,459,284 B2 6/2013 Brennan et al.
11,427,488 B2 * 8/2022 Blanchette ............ B01F 21/221
2012/0067968 A1 * 3/2012 Brennan ........... B01F 25/31243 239/9
2020/0346175 A1 * 11/2020 Blanchette .............. B01F 25/25

* cited by examiner

*Primary Examiner* — Kevin R Barss
(74) *Attorney, Agent, or Firm* — Lorenz & Kopf, LLP

(57) ABSTRACT

A device is provided for preparing a chemical solution. The device comprises a dissolving bowl having an open top portion for receiving a solid chemical material and a closed bottom portion. A grid member is disposed between the top and bottom portions for supporting the chemical material on a top surface thereof defining an array of grid openings and a flow opening distinct therefrom. A nozzle is positioned proximate the bottom portion and directs flow of an aqueous fluid to contact and dissolve at least some of the chemical material and create a chemical solution thereof Δn insert disposed proximate the grid member impedes flow of the aqueous fluid through one or more of the grid openings to increase fluid turbulence within the dissolving bowl and/or redirects the fluid flowing from the flow opening to flow in one or more directions over the grid member.

19 Claims, 7 Drawing Sheets

DEVICES AND SYSTEMS FOR PREPARING A CHEMICAL SOLUTION

CROSS REFERENCE TO RELATED APPLICATIONS

This application claims the benefit of U.S. Provisional Application No. 63/366,404, filed Jun. 15, 2022, which is hereby incorporated by reference herein in its entirety.

TECHNICAL FIELD

The present invention generally relates to water treatment, and more particularly relates to devices and systems for creating a chemical solution for water treatment.

BACKGROUND

Water is used in many commercial, industrial, and recreational applications. Depending on the specific end use, water may require specific treatments. The end use may include, but is not limited to, drinking, industrial water supply, irrigation, river flow maintenance, water recreation, or many other uses, including the safe return of used water to the environment. Water treatment generally improves the quality of the water by removing contaminants and undesirable components or reducing their concentration so that the water becomes fit for its desired end use. When left untreated, water may cause corrosion or mechanical failure of equipment to occur, resulting in costly repairs. Furthermore, in certain applications, if left untreated, water may provide for growth of bacteria, algae, and other undesirable organisms, such that persons exposed to an untreated water supply, either by way of ingestion or direct physical contact, may become ill and face serious medical issues, and possibly death.

Common water treatment practices generally rely on the introduction of treatment chemicals to control such organisms on a periodic or continuous basis. For example, some water treatment systems use chemical feeders that bring water into contact with solid, dry treatment chemicals. The feeders are designed to dissolve the treatment chemicals in the water in a controlled manner. In conventional chemical feeders, solid pellets of calcium hypochlorite ("cal hypo") are dissolved to introduce chlorine into the water stream. Chlorine in the water is generally expressed as a concentration of free available chlorine (FAC). In order to provide dissolution at a desired rate to maintain the desired FAC concentration, conventional chemical feeders often require extensive maintenance. Treatment chemicals must be added to the device frequently, and maintenance is also required to remove the accumulation of deposits or residue on the device, such as calcium carbonate deposits. As such, conventional chemical feeder designs generally require considerable supervision and intervention (i.e., monitoring equipment and handling of chemical materials) to ensure the chemical feeder is functioning as intended, which can be arduous and time consuming and further result in a user being exposed to chemicals during handling thereof.

In addition to the above, fluid within chemical feeders may contain solid, insoluble particles capable of settling in stagnant or slow-moving volumes of the fluid. Accumulation of such insoluble particles within the chemical feeders may cause operational issues and potentially even lead to system failure over time.

Hence, there is a need for devices and/or systems for water treatment that can reduce accumulation of insoluble particles within the devices and/or systems relative to existing devices and systems.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A device is provided for preparing a chemical solution. The device comprises a dissolving bowl comprising an open top portion for receiving a solid chemical material therethrough and a closed bottom portion. A grid member is disposed within the dissolving bowl between the top portion and the bottom portion. The grid member is arranged for supporting the solid chemical material on a top surface of the grid member defining an array of grid openings and a flow opening distinct from the grid openings. A nozzle is disposed within the dissolving bowl and positioned proximate the bottom portion. The nozzle is arranged to direct flow of an aqueous fluid into the dissolving bowl from the bottom portion towards the grid member to thereby cause the aqueous fluid to contact and dissolve the solid chemical material and create the chemical solution of the aqueous fluid and the solid chemical material dissolved therein. The grid openings allow the chemical solution to flow therethrough toward the bottom portion of the dissolving bowl. The nozzle is directed toward the flow opening of the grid member to provide fluid flow from the nozzle toward the flow opening of the grid member. An insert is disposed within the dissolving bowl and proximate the grid member. The insert is arranged to impede flow of the aqueous fluid through one or more of the grid openings sufficient to increase fluid turbulence within the dissolving bowl and/or redirect the fluid flowing from the flow opening to flow in one or more directions over the top surface of the grid member.

A system is provided for preparing a chemical solution. The system comprises a chemical feeder comprising a dissolving bowl comprising an open top portion for receiving a solid chemical material therethrough and a closed bottom portion. A grid member is disposed within the dissolving bowl between the top portion and the bottom portion. The grid member is arranged for supporting the solid chemical material on a top surface of the grid member defining an array of grid openings and a flow opening distinct from the grid openings. A nozzle is disposed within the dissolving bowl and positioned proximate the bottom portion. The nozzle is arranged to direct flow of an aqueous fluid into the dissolving bowl from the bottom portion towards the grid member to thereby cause the aqueous fluid to contact and dissolve the solid chemical material and create the chemical solution of the aqueous fluid and the solid chemical material dissolved therein. The grid openings allow the chemical solution to flow therethrough toward the bottom portion of the dissolving bowl. The nozzle is directed toward the flow opening of the grid member to provide fluid flow from the nozzle toward the flow opening of the grid member. An insert is disposed within the dissolving bowl and proximate the grid member. The insert is arranged to impede flow of the aqueous fluid through one or more of the grid openings sufficient to increase fluid turbulence within the dissolving bowl and/or redirect the fluid flowing from the flow opening to flow in one or more directions over the top surface of the grid member.

Furthermore, other desirable features and characteristics of the device and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
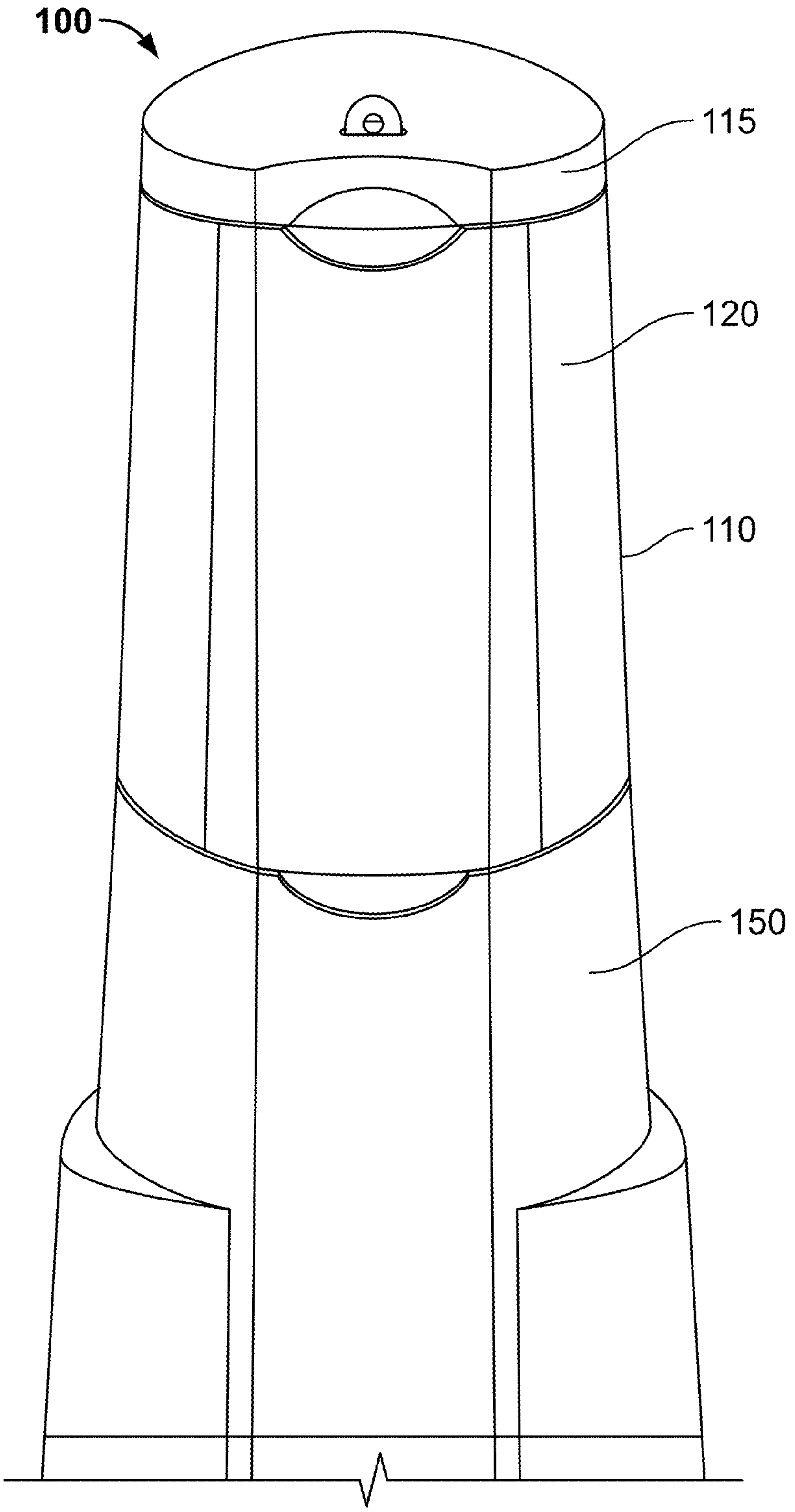
FIG. 1 shows a front view of an embodiment of a water treatment device in accordance with certain aspects of the invention.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

By way of overview, the present invention is directed to devices and related systems for preparing a chemical solution as well as inserts that may be installed in such devices to improve the functionality thereof. The invention is useful for water treatment, as the devices and systems may be used to prepare chemical solutions by mixing a chemical material with an aqueous fluid (e.g., water) and providing the chemical solution to water undergoing treatment. In certain embodiments, the chemical material may be calcium hypochlorite ($Ca(OCl)_2$), also known as cal hypo. However, it should be noted that any chemical material may be used. Often, the chemical material is provided in solid form as briquettes or tablets. The devices of the present invention dissolve the briquettes or tablets to prepare a chemical solution for water treatment. Accordingly, the devices may be referred to herein as erosion feeders or chemical feeders, for example. The devices of the present invention may be particularly useful for commercial swimming pool chlorination, municipal drinking water chlorination, agricultural water chlorination, and industrial water chlorination.

FIGS. 1 through 4 show certain aspects of an embodiment of a water treatment device 100 consistent with the present disclosure. Certain additional aspects of the water treatment device 100 are disclosed in U.S. patent application Ser. No. 16/864,372 to Blanchette et al. (referred to hereinafter as Blanchette et al.), published as U.S. Patent Application Publication No. 2020/0346175, incorporated in its entirety herein.

In general, the device 100 includes a housing 110 including an upper chamber 120 and a lower chamber 150. Chemical material in a solid form (not shown), such as briquettes or tablets, may be loaded (inserted) into the upper chamber 120 through an opening 185 at an upper portion thereof. The upper chamber 120 may further include a lid 115 for selectively covering the opening 185.

Figure 2:
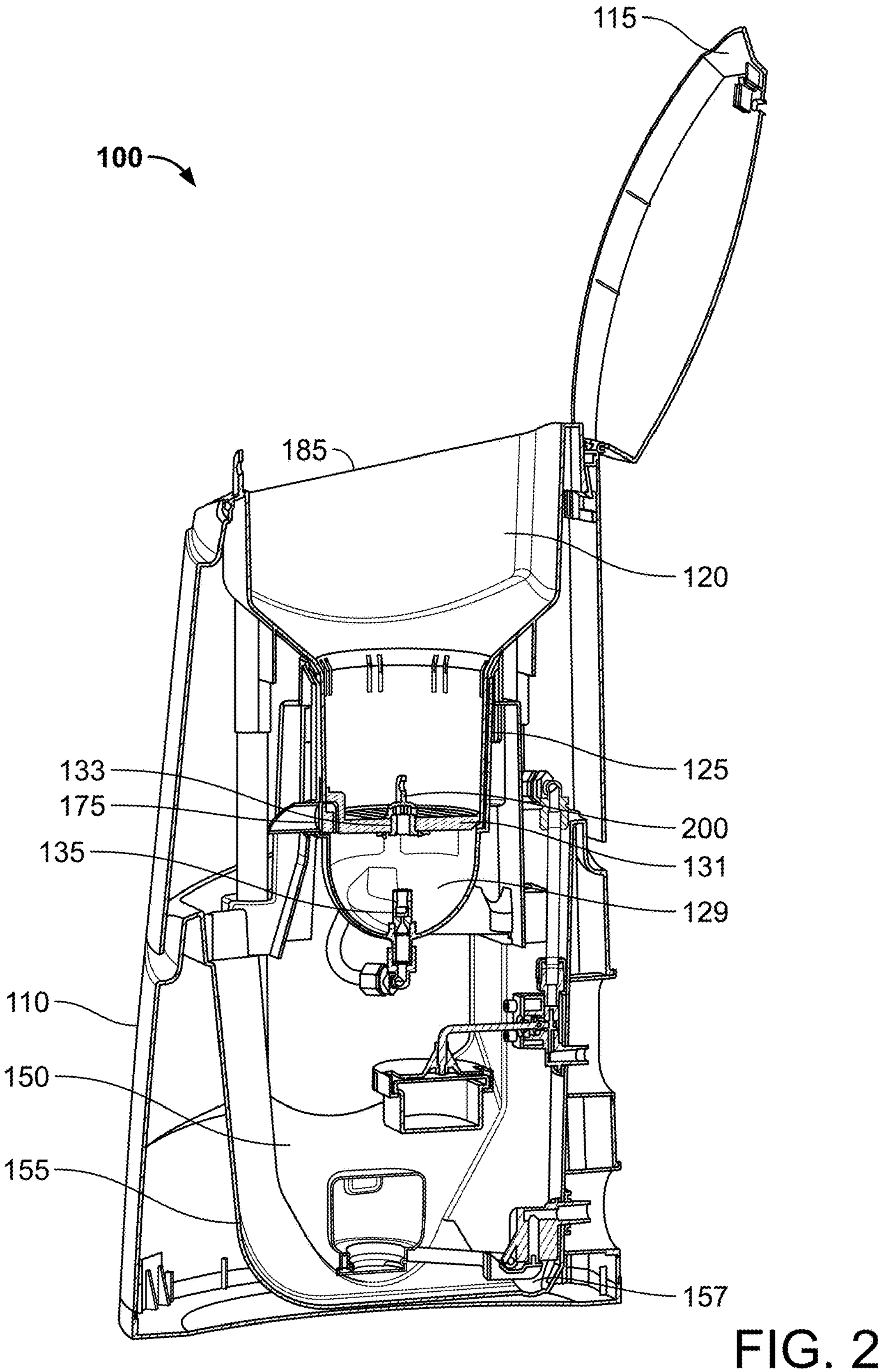
FIG. 2 shows a cross-sectional view of the water treatment device of FIG. 1.

FIG. 2 shows a cross-sectional view of the device 100. In FIG. 2, the lid 115 to the upper chamber 120, or hopper, is open. A dissolving bowl 125 is arranged at an interface of the lower chamber 150 and upper chamber 120. The dissolving bowl 125 comprises an open-ended top in communication with the upper chamber 120 for receiving the chemical material therefrom and a closed bottom portion 129.

A grid member 131 is disposed within the upper chamber 120 and suspended above the bottom portion 129 of the dissolving bowl 125. As shown, the grid member 131 is generally in the form of a disk that is shaped and/or sized to correspondingly fit within upper chamber 120 in a nesting arrangement, such that the grid member 131 is retained a distance from the bottom portion 129 of the dissolving bowl 125. The grid member 131 is configured to support the solid, undissolved chemical material (of a particular size and/or dimension) on a top surface thereof and maintain physical separation of the chemical material (at its original size and/or dimension) from at least the bottom portion 129 of the dissolving bowl 125. As shown, the grid member 131 comprises a central flow opening 133 substantially aligned with a nozzle 135 to allow fluid flow from the nozzle 135 through the grid member 131. However, this arrangement is nonlimiting as the flow opening 133 may be in other locations of the grid member 131 (i.e., other than the center) and the nozzle 135 may be aligned with and/or directed toward the flow opening 133.

The nozzle 135 is disposed within the dissolving bowl 125 and positioned proximate the bottom portion 129. The nozzle 135 is arranged to direct flow of an aqueous fluid into the dissolving bowl 125 and towards the grid member 131 to thereby cause the aqueous fluid to contact and dissolve at least some of the solid chemical material therein and create a chemical solution of the aqueous fluid and the dissolved chemical material based, at least in part, on fluid flow from the nozzle 135. In this embodiment, the nozzle 135 is centrally positioned within the dissolving bowl 125. However, as noted previously, the nozzle 135 may be located in other locations within the dissolving bowl 125. In some examples, the nozzle 135 comprises an eductor oriented to discharge fluid in a direction towards the grid member 131 and away from the bottom portion 129 of the dissolving bowl 125.

The dissolving bowl 125 comprises an outlet 175 provided along a portion of a sidewall of the dissolving bowl 125 and proximate to the grid member 131 at the base of the grid member 131. As shown, the outlet 175 is generally in fluid communication with the lower chamber 150 and allows for the chemical solution to flow from the dissolving bowl 125 into the lower chamber 150. The outlet flow from the dissolving bowl 125 is directed to fall into the lower chamber 150 near a chemical solution outlet port of the device 100. The lower chamber 150 comprises a contoured base 155 with a low section 157 defined at a center the contoured base 155. The inlet flow provided to the lower chamber 150 functions in combination with the contoured base 155 to direct flow of any solid, insoluble particles included in the chemical solution towards the low section 157 of the contoured base 155 to thereby remove the insoluble particles from the chemical solution and away from the outlet port of the device 100.

Figure 3:
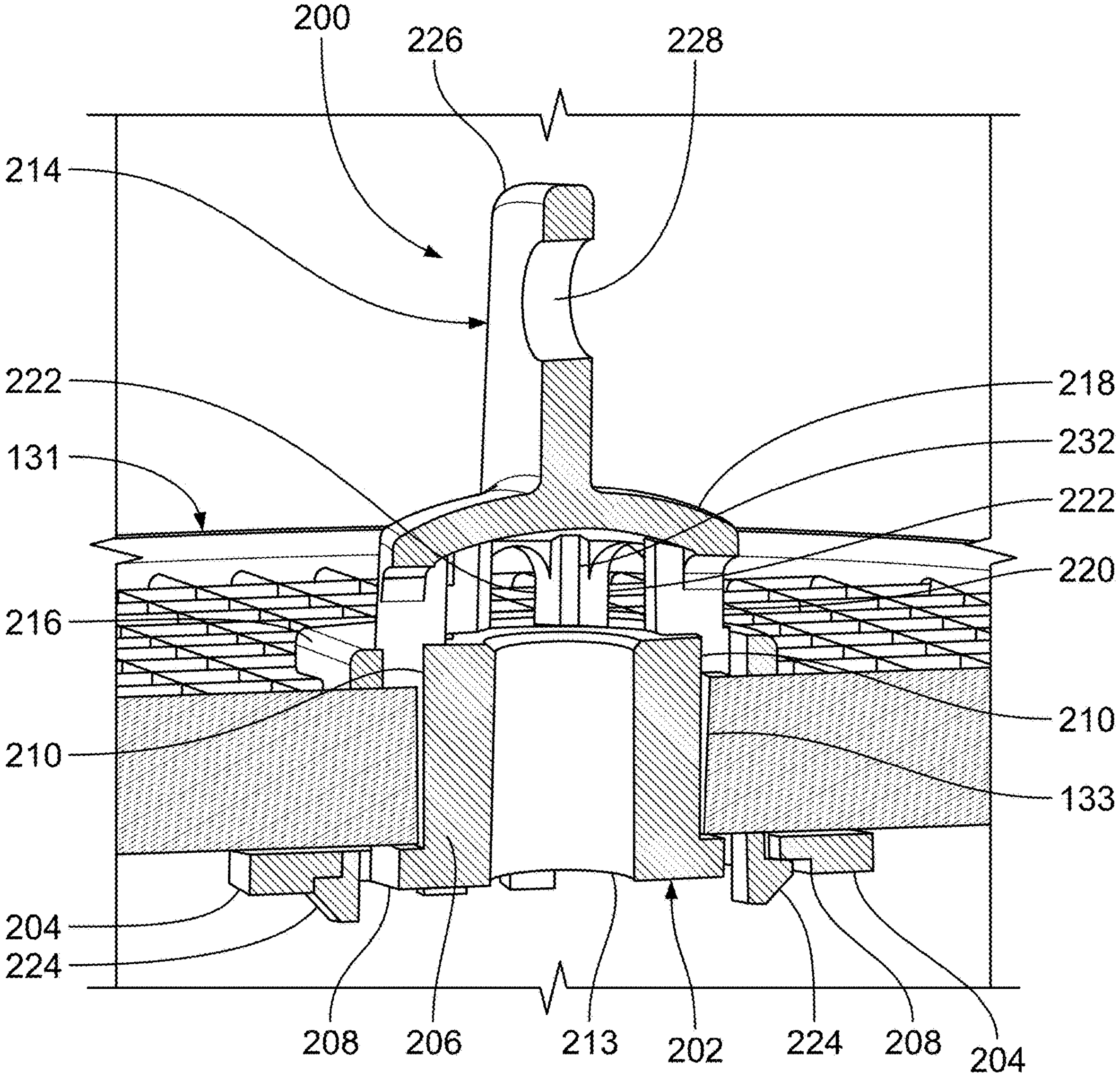
FIG. 3 shows an enlarged cross-sectional view of an insert secured proximate to the grid member of the water treatment device of FIGS. 1 and 2.
Figure 4:
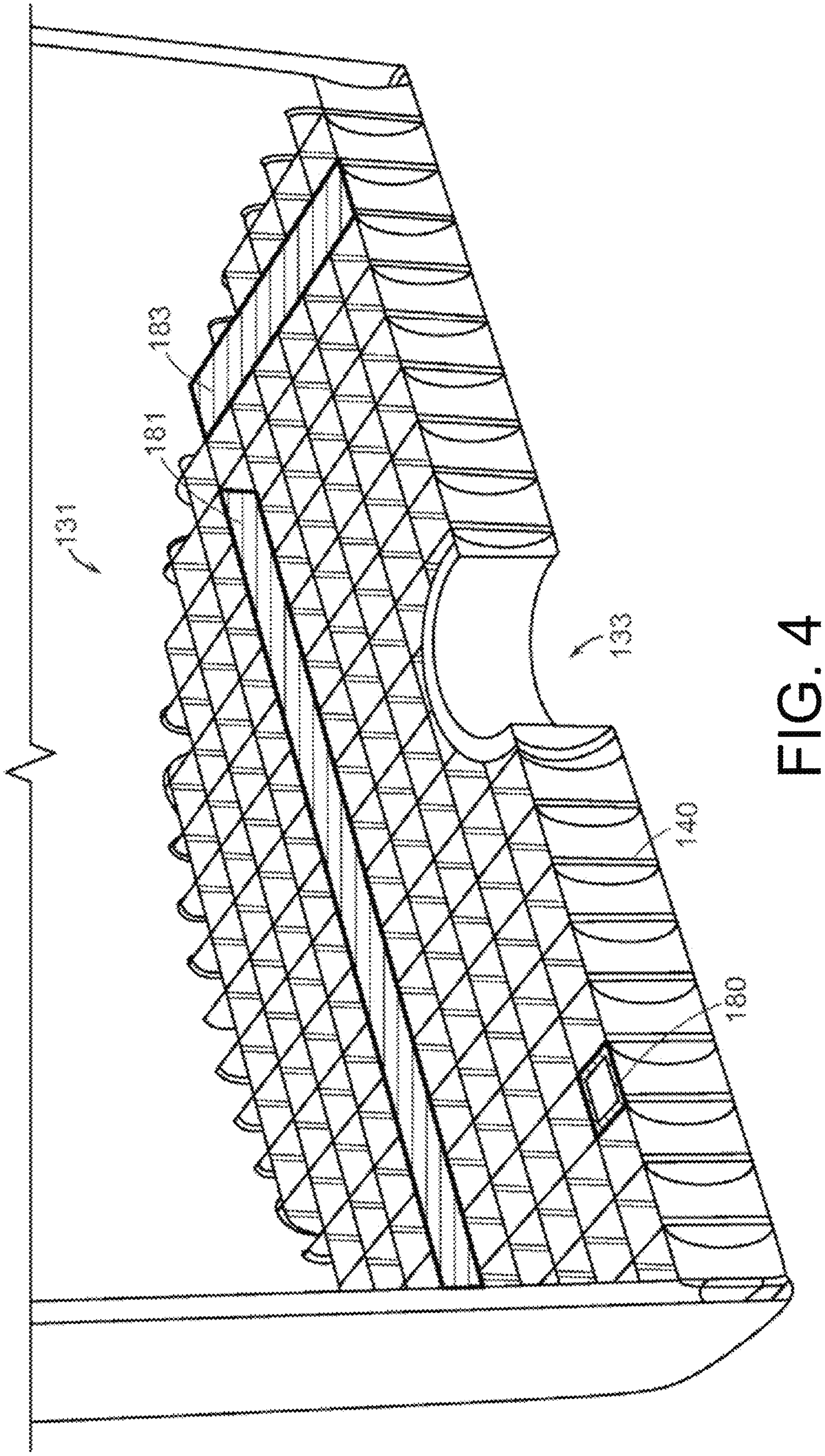
FIG. 4 shows a perspective cutaway view of the grid member of the water treatment device of FIGS. 1 through 3 with the insert omitted for clarity.

FIGS. 3 and 4 present aspects of the grid member 131. FIG. 4 omits an insert 200 (described in more detail below) for clarity. The grid member 131 comprises a framework of a first set of the beams 140 and a second set of the beams 140 arranged relative to one another, each of the beams 140 in the first and second sets includes a substantially elliptical cross-sectional shape. The first set of the beams 140 are substantially parallel with and spaced apart from one another and oriented in a first direction 181 and the second set of the beams 140 are substantially parallel with and spaced apart from one another and oriented in a second direction 183 perpendicular to the first direction 181. The first and second sets of the beams 140 traverse one another, thereby forming a grid. As shown, the grid member 131 comprises a plurality of square-shaped grid openings 180 defined between the first and second sets of the beams 140 that allow fluid to flow therethrough. In preferred embodiments, each of the grid openings 180 is about 0.25 square inches (1.6 square centimeters). As previously noted, the grid member 131 comprises the flow opening 133 substantially aligned with the nozzle 135 to allow fluid flow from the nozzle 135 through the grid member 131. Preferably, the flow opening 133 is larger than the individual grid openings 180.

The grid openings 180 in the grid member 131 allow sufficient fluid flow through the grid member 131 while holding the solid, undissolved chemical material (of a particular size and/or dimension) above the grid member 131, at least until partially dissolved solid particles thereof are small enough to pass through the grid openings 180. Preferably, the grid openings 180 are sized such that the partially dissolved solid particles that pass therethrough are sufficiently small such that as to be of no consequence, that is, to not have a negative impact on the operation of the device 100. For example, if the partially dissolved solid particles are too large and fall to the bottom of the dissolving bowl 125 where the nozzle 135 is located, the nozzle 135 could become blocked. In particular, if the partially dissolved solid particles were too big, the nozzle 135 would experience diminished flow due to a blocked entrainment feature, thereby lowering the dissolving rate of the chemical material and chemical (e.g., chlorine) output rate of the device 100. Preferably, the grid openings 180 between the beams 140 of the grid member 131 provide for a high concentration of the chemical solution without allowing solid particles large enough to impede entrainment to fall through the grid member 131 into the dissolving bowl 125.

Certain operating parameters of the water treatment device 100 of FIGS. 1 through 4 may be improved and/or adjusted by incorporation therein of the insert 200 located proximate to the grid member 131. The insert 200 may modify flow of the aqueous fluid through the grid member 131 adjacent to the flow opening 133, through the flow opening 133, and/or upon exiting the flow opening 133. In certain embodiments, the insert 200 may be capable of modifying fluid flow about the flow opening 133 in a manner that reduces accumulation of insoluble particles in the dissolving bowl 125, reduces the likelihood of undesirable or less than optimal conditions within the upper chamber 120, and/or promotes uniform contact between the aqueous fluid and the solid chemical material on the grid member 131.

Figure 5:
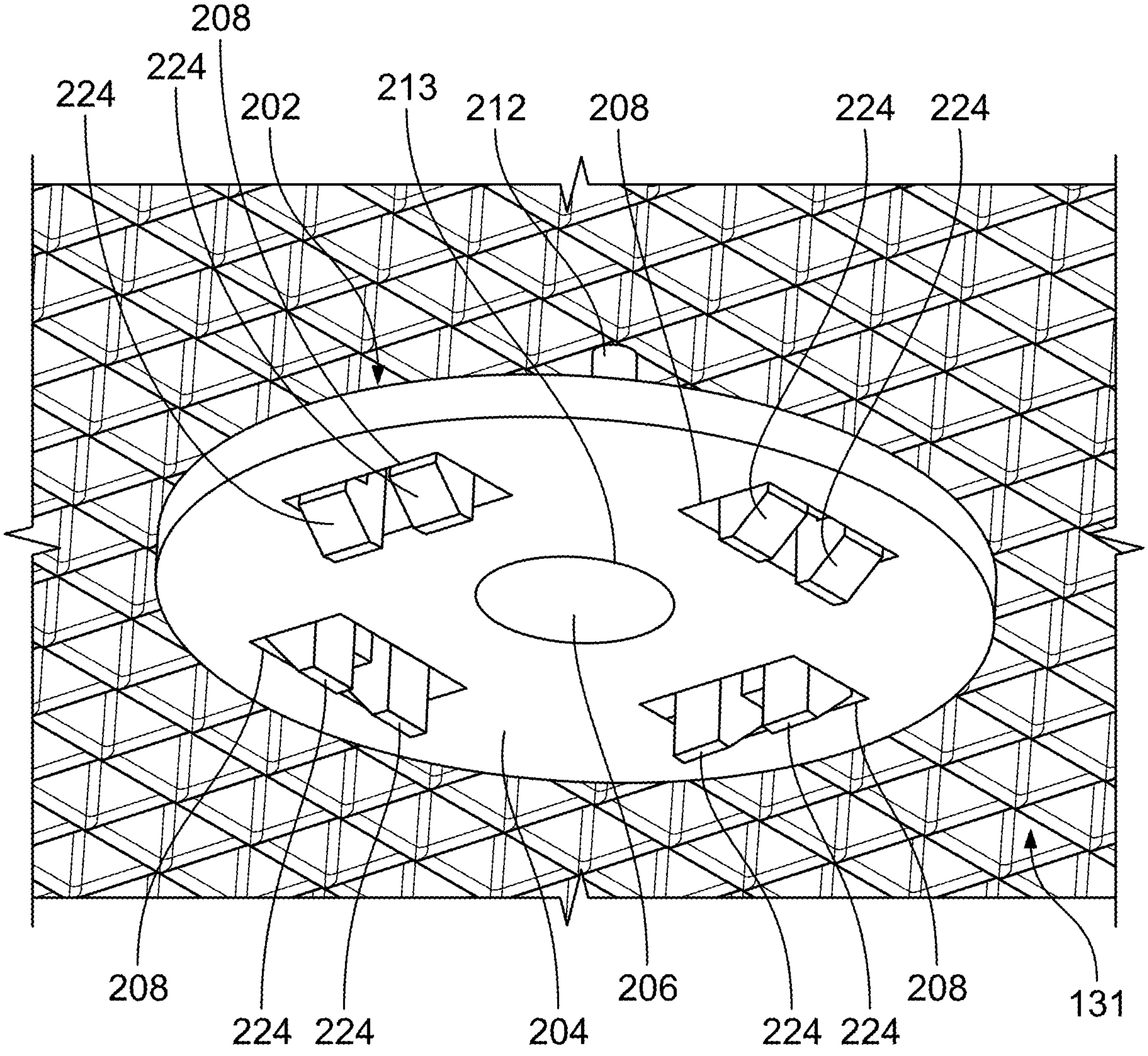
FIG. 5 shows a bottom, perspective view of a flow impeding member of the insert secured proximate to the grid member of FIGS. 2 and 3.
Figure 6:
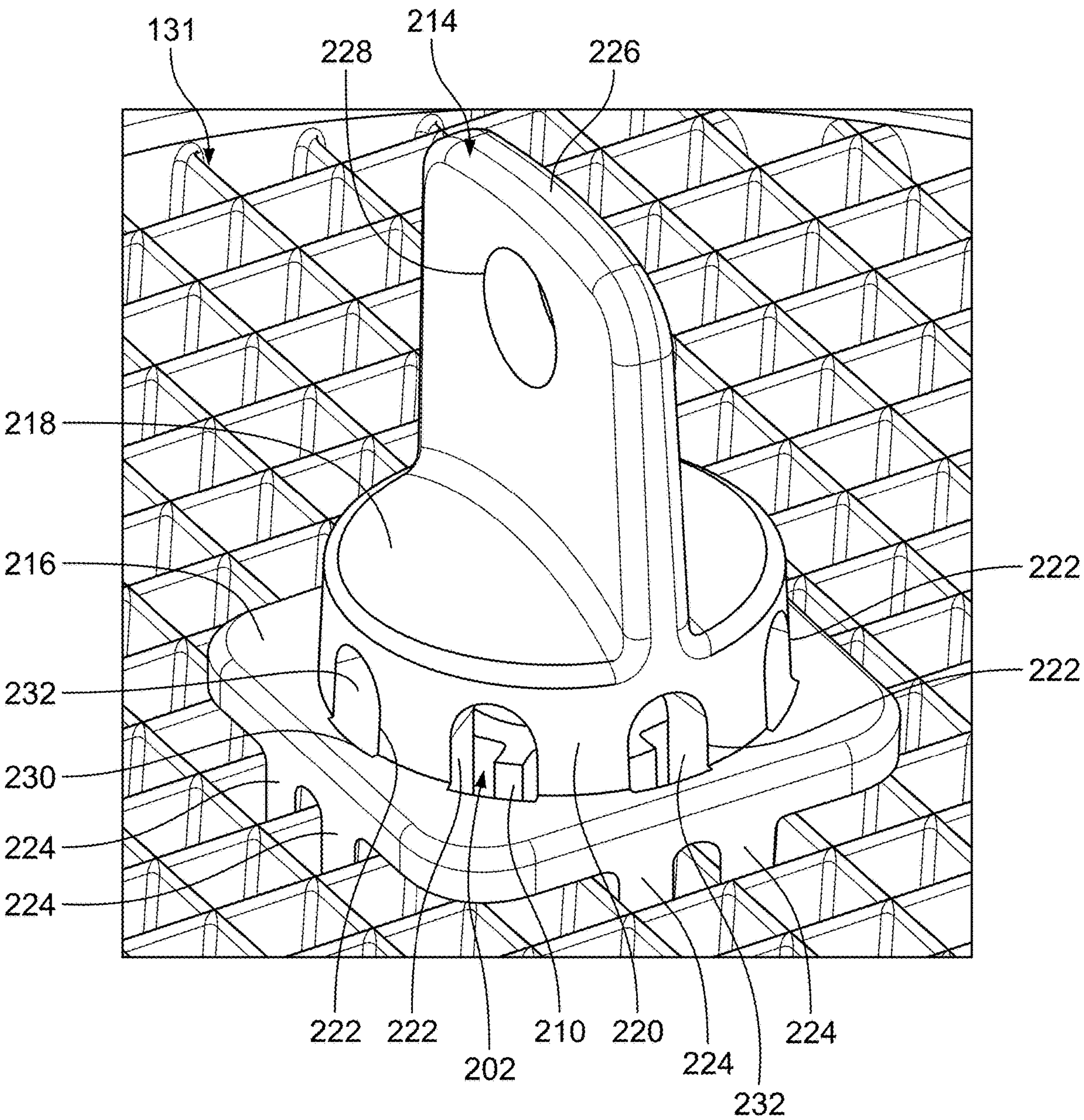
FIG. 6 shows a top, perspective view of a flow redirecting member of the insert secured proximate to the grid member of FIGS. 2 and 3.

FIGS. 3, 5, and 6 show a nonlimiting embodiment of the insert 200 that includes an assembly of a flow impeding member 202 (FIG. 5) and a flow redirecting member 214 (FIG. 6). The flow impeding member 202 is disposed within the dissolving bowl 125 and proximate the bottom surface of the grid member 131, and the flow redirecting member 214 is disposed within the upper chamber 120 and proximate the top surface of the grid member 131. The flow impeding member 202 includes a disc-shaped portion 204 having upper and lower faces, and a centrally located, tubular portion 206 configured to be located within the flow opening 133 of the grid member 131. The flow redirecting member 214 includes a rectangular lower portion 216, a circular upper portion 218, and sidewalls 220 having an annular profile between and coupling the lower portion 216 and the upper portion 218.

The flow impeding member 202 and the flow redirecting member 214 may be secured relative to the grid member 131 in various manners. As a nonlimiting example, FIGS. 5 and 6 represent the flow redirecting member 214 as including elongated connection members 224 protruding from lower surfaces of the lower portion 216. The connection members 224 are configured to be received within and extend through some of the grid openings 180 of the grid member 131. The flow impeding member 202 includes engagement openings 208 arranged to receive distal portions of the connection members 224 that extend from the bottom surface of the grid member 131. In combination, the connection members 224 and the engagement openings 208 may function to releasably couple the flow impeding member 202 and the flow redirecting member 214 to each other on opposite sides of the grid member 131 with a snap fit-type connection.

Specifically, the connection members 224 may be biased in a direction radially outward from a centrally located interior opening 230 of the flow redirecting member 214 and include ledges proximate to the distal ends of thereof. Upon insertion of the distal ends through the engagement openings 208 to an extent sufficient to locate the ledges below the lower face of the flow impeding member 202, the biasing of the connection members 224 may cause the ledges to be located over the lower face and function as a barrier to relative movement of the flow impeding member 202 and the flow redirecting member 214. The distal portions of the connection members 224 may further include chamfered edges facing radially outward from the interior opening 230 to promote ease of insertion of the connection members 224 into the engagement openings 208. In this arrangement, the flow impeding member 202 and the flow redirecting member 214 are coupled to each other and retained in fixed positions relative to the grid member 131 without directly engaging the grid member 131.

A particular benefit of the arrangement described above, that is, the flow impeding member 202 and the flow redirecting member 214 coupling to each other rather than directly to the grid member 131, is that the insert 200 may be backward compatible with various previously existing water treatment devices, and/or compatible with the device 100 having various sizes and capacities.

The insert 200 may include alignment features configured to align the engagement openings 208 of the flow impeding member 202 with the connection members 224 of the flow redirecting member 214. For example, radially outer surfaces of the tubular portion 206 of the flow impeding member 202 may have outwardly protruding alignment ribs 210 extending along a longitudinal length thereof that define therebetween valleys, and the flow redirecting member 214 may include inwardly protruding alignment ribs 232 extending along the sidewalls 220 between the radial openings 222. During assembly of the insert 200, the inwardly protruding alignment ribs 232 may be aligned with and inserted into the valleys thereby ensuring that the connection members 224 are aligned with and received within the engagement openings 208. The flow impeding member 202 may include grid alignment pins 212 for orienting the flow impeding member 202 such that the engagement openings 208 align with grid openings 180.

Alternatively, the flow impeding member 202 and the flow redirecting member 214 may be secured relative and/or directly to the grid member 131 by independent means. For example, one or both of the flow impeding member 202 and the flow redirecting member 214 may releasably couple directly with the grid member 131 with snap fit-type connections.

The flow redirecting member 214 includes the interior opening 230 in the lower portion 216 configured to receive fluid flow therethrough from a central passage 213 of the tubular portion 206 of the flow impeding member 202. The fluid flowing through the interior opening 230 is received within an enclosure defined by interior surfaces of the upper portion 218 and the sidewalls 220. With this arrangement, the fluid flowing through the tubular portion 206 of the flow impeding member 202 is blocked by the interior surface of the upper portion 218 and redirected through one or more radial openings 222 in the sidewalls 220.

In this embodiment, the insert 200 is arranged to increase turbulence of fluid within the dissolving bowl 125 below the grid member 131 to reduce accumulation of insoluble particles therein, and to change the flow direction and/or reduce the velocity of the aqueous fluid exiting the flow opening 133 which may cause undesirable conditions within the upper chamber 120.

Specifically, the flow impeding member 202 is arranged to partially block flow of the stream of the aqueous fluid from the nozzle 135 within the bottom portion 129 of the dissolving bowl 125 and thereby cause an increase in turbulence of fluid within the dissolving bowl 125. The flow impeding member 202 allows the aqueous fluid flowing from the nozzle 135 to pass through a central passage 213 of the tubular portion 206, and therefore the flow opening 133, while simultaneously restricting or blocking upward fluid flow through at least some of the grid openings 180 adjacent to or surrounding the flow opening 133. In this manner, the flow impeding member 202 may significantly increase turbulence of fluid within the dissolving bowl 125 and thereby reduce accumulation of insoluble particles therein. Such insoluble particles are preferably carried by the fluid through the outlet 175 and into the lower chamber 150 where the insoluble particles may be removed from the device 100.

In addition, the flow redirecting member 214 is arranged to redirect the fluid flowing through the flow opening 133 from an original direction (e.g., aligned with the longitudinal axis of the flow opening 133) to flow in one or more other directions over the top surface of the grid member 131, such as in multiple directions substantially parallel to the top surface of the grid member 131. As noted previously, the fluid flowing through the interior opening 230 is received within the enclosure defined by the interior surfaces of the upper portion 218 and the sidewalls 220. With this arrangement, the fluid flowing through the tubular portion 206 of the flow impeding member 202 is blocked by the interior surface of the upper portion 218 and redirected through the radial opening(s) 222 in the sidewalls 220. As such, the flow redirecting member 214 changes the flow direction and reduces the velocity of the aqueous fluid exiting the flow opening 133 which may reduce the likelihood of an occurrence of undesirable conditions within the upper chamber 120.

The radial opening(s) 222 may have various sizes, shapes, and quantities which may affect the concentration of the chemical solution produced by the device 100. In some embodiments, the concentration of the chemical solution may be controlled, within certain boundaries, by manipulating the position and/or size of the radial opening(s) 222. In experimental investigations leading to certain aspects of the invention, it was observed that the concentration of the chemical solution was lower for embodiments comprising smaller radial opening(s) 222. Preferred concentrations of the chemical solution will be dependent on the specific application. As a nonlimiting example, for embodiments that produce a chlorinated solution (e.g., to treat pool water), the chlorine concentration of the chemical solution may be equal to or less than about 0.4 wt. %, preferably between 0.2 and 1.2 wt. %, and more preferably between 0.3 and 0.7 wt. %.

The flow redirecting member 214 may include a tab 226, optionally with a hole 228 therethrough. The tab 226 provides a fingerhold that can promote ease of installation of the flow redirecting member 214.

The device 100 may be useful for various applications such as but not limited to commercial swimming pool chlorination, municipal drinking water chlorination, agricultural water chlorination, and industrial water chlorination. Exemplary but nonlimiting operational parameters of the device 100 may include fluid temperatures of between about 50 and 110° F. (10 and 43° C.), fluid flow rates of between about 0.2 and 5 gpm (0.8 and 18.9 lpm), preferably between 0.5 and 4.0 gpm (1.9 and 15.1 lpm), and fluid pressures between about 10 and 30 psi (69 and 207 kpa).

The insert 200 and/or the components thereof may be formed of various materials (e.g., polymeric, metallic, ceramic, or composite materials) and produced by various manufacturing processes (e.g., molding, milling, additive manufacturing, etc.). In certain embodiments, the flow impeding member 202 and the flow redirecting member 214 may both be formed of a polymeric material and produced by an injection molding process.

Figure 7:
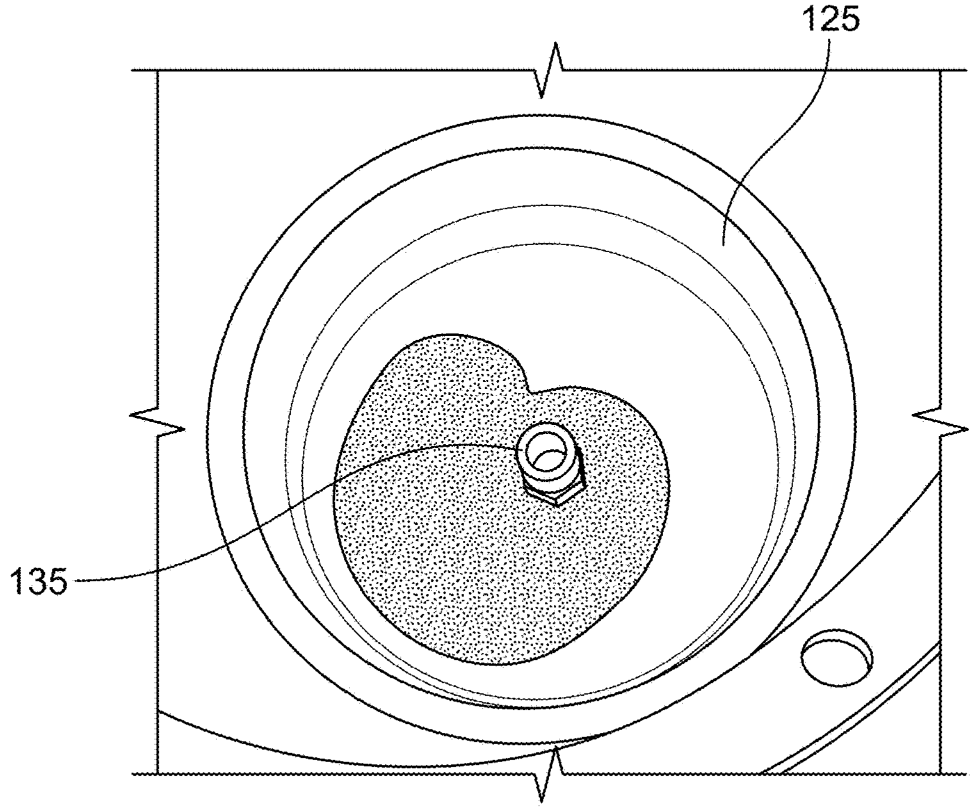
FIG. 7 shows a top view of a dissolving bowl of the water treatment device of FIGS. 1 through 6 and represents exemplary accumulation of insoluble particles in a bottom portion thereof after operating the water treatment device without the insert of FIGS. 2, 3, 5, and 6.
Figure 8:
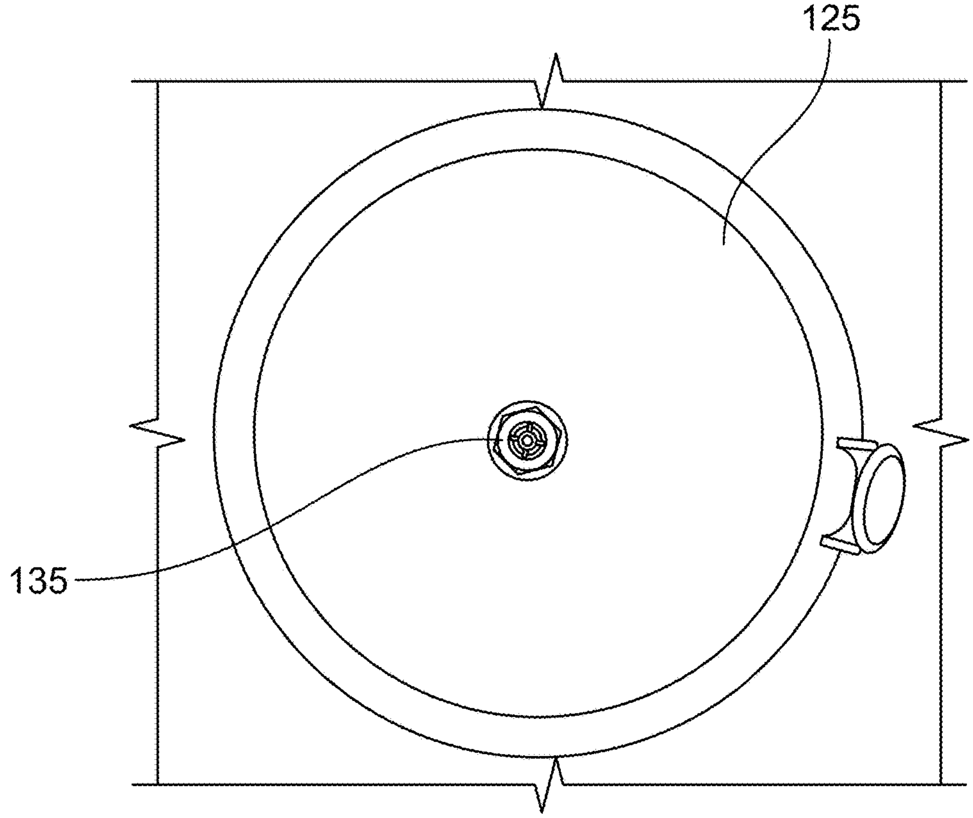
FIG. 8 shows a top view of the dissolving bowl of the water treatment device of FIGS. 1 through 6 and represents exemplary accumulation of insoluble particles in the bottom portion thereof after operating the water treatment device with the insert of FIGS. 2, 3, 5, and 6.

FIGS. 7 and 8 represent top views of the dissolving bowl 125 that represent exemplary accumulation of solid insoluble particles after operating the device 100 without and with the insert 200, respectively, for a specific period of time during investigations leading to nonlimiting aspects of the present invention. As represented, operation without the insert 200 (FIG. 7) resulted in a moderate accumulation of insoluble particles (black particulate material) in the bottom portion 129 of the dissolving bowl 125. In contrast, operation with the insert 200 (FIG. 8) resulted in significantly less accumulation of insoluble particles therein.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention. Finally, while the appended claims recite certain aspects believed to be associated with the invention, they do not necessarily serve as limitations to the scope of the invention.

What is claimed is:

1. A device for preparing a chemical solution comprising:

a dissolving bowl comprising an open top portion for receiving a solid chemical material therethrough and a closed bottom portion;

a grid member disposed within the dissolving bowl between the top portion and the bottom portion, the grid member arranged for supporting the solid chemical material on a top surface thereof, the grid member defining an array of grid openings and a flow opening distinct from the grid openings;

a nozzle disposed within the dissolving bowl and positioned proximate the bottom portion, the nozzle arranged to direct flow of an aqueous fluid into the dissolving bowl from the bottom portion towards the grid member to thereby cause the aqueous fluid to contact and dissolve the solid chemical material and create the chemical solution of the aqueous fluid and the solid chemical material dissolved therein, wherein the grid openings allow the chemical solution to flow therethrough toward the bottom portion of the dissolving bowl, wherein the nozzle is directed toward the flow opening of the grid member to provide fluid flow from the nozzle toward the flow opening of the grid member; and an insert disposed within the dissolving bowl and proximate the grid member, the insert arranged to impede flow of the aqueous fluid through one or more of the grid openings sufficient to increase fluid turbulence within the dissolving bowl and/or redirect the fluid flowing from the flow opening to flow in one or more directions over the top surface of the grid member.

2. The device of claim 1, wherein the insert includes a flow impeding member arranged to impede the flow of the aqueous fluid through the one or more of the grid openings sufficient to increase fluid turbulence within the dissolving bowl.

3. The device of claim 2, wherein the flow impeding member comprises a disc-shaped portion.

4. The device of claim 2, wherein the flow impeding member is arranged to allow fluid flow through the flow opening while simultaneously impeding the flow of the aqueous fluid through the one or more of the grid openings which surround the flow opening.

5. The device of claim 2, wherein the flow impeding member comprises a tubular portion arranged to be inserted into the flow opening.

6. The device of claim 1, wherein the insert includes a flow redirecting member arranged to redirect the fluid flowing from the flow opening to flow in one or more directions over the top surface of the grid member.

7. The device of claim 6, wherein the flow redirecting member comprises a body having an upper portion and sidewalls fixed to the upper portion and defining one or more openings, wherein the upper portion and the sidewalls define an enclosure configured to receive the aqueous fluid flowing from the flow opening and direct the aqueous fluid through the one or more openings in the sidewalls.

8. The device of claim 7, wherein the body of the flow redirecting member has a lower portion fixed to the sidewalls opposite the upper portion, the lower portion arranged to contact the top surface of the grid member.

9. The device of claim 6, wherein the flow redirecting member has a tab arranged to function as a fingerhold to promote ease of installation of the flow redirecting member.

10. The device of claim 1, wherein the insert includes an assembly of a flow impeding member proximate a bottom surface of the grid member and arranged to impede the flow of the aqueous fluid through the one or more of the grid openings sufficient to increase fluid turbulence within the dissolving bowl and a flow redirecting member proximate the top surface of the grid member and arranged to redirect the fluid flowing from the flow opening to flow in one or more directions over the top surface of the grid member, and the flow impeding member and the flow redirecting member are coupled to each other and thereby retained in fixed positions relative to the grid member.

11. The device of claim 10, wherein the flow redirecting member comprises an elongated connection member arranged to extend through one or more of the grid openings and engage with the flow impeding member to releasably couple the flow redirecting member and the flow impeding member to each other.

12. The device of claim 11, wherein the insert includes alignment features configured to align the elongated connection member with an engagement opening of the flow impeding member.

13. The device of claim 1, wherein the solid chemical material is calcium hypochlorite.

14. The device of claim 1, wherein a fluid flow rate of the device during operation thereof is between about 0.2 and 5 gpm (0.8 and 18.9 lpm).

15. A system for preparing a chemical solution comprising:

a chemical feeder comprising:

a dissolving bowl comprising an open top portion for receiving a solid chemical material therethrough and a closed bottom portion;

a grid member disposed within the dissolving bowl between the top portion and the bottom portion, the grid member arranged for supporting the solid chemical material on a top surface thereof, the grid member defining an array of grid openings and a flow opening distinct from the grid openings;

a nozzle disposed within the dissolving bowl and positioned proximate the bottom portion, the nozzle arranged to direct flow of an aqueous fluid into the dissolving bowl from the bottom portion towards the grid member to thereby cause the aqueous fluid to contact and dissolve the solid chemical material and create the chemical solution of the aqueous fluid and the solid chemical material dissolved therein, wherein the grid openings allow the chemical solution to flow therethrough toward the bottom portion of the dissolving bowl, wherein the nozzle is directed toward the flow opening of the grid member to provide fluid flow from the nozzle toward the flow opening of the grid member; and an insert disposed within the dissolving bowl and proximate the grid member, the insert arranged to impede flow of the aqueous fluid through one or more of the grid openings sufficient to increase fluid turbulence within the dissolving bowl and/or redirect the fluid flowing from the flow opening to flow in one or more directions over the top surface of the grid member.

16. The system of claim 15, wherein the insert includes a flow impeding member arranged to impede flow of the aqueous fluid through the one or more grid openings sufficient to increase fluid turbulence within the dissolving bowl, the flow impeding member comprising a disc-shaped portion that is proximate a bottom surface of the grid member.

17. The system of claim 16, wherein the flow impeding member is arranged to allow fluid flow through the flow opening while simultaneously impeding flow of the aqueous fluid through the one or more of the grid openings which surround the flow opening.

18. The system of claim 15, wherein the insert comprises a flow redirecting member arranged to redirect the fluid flowing from the flow opening to flow in one or more directions over the top surface of the grid member, the flow redirecting member comprises a body having an upper portion and sidewalls fixed to the upper portion and defining one or more openings, wherein the upper portion and the sidewalls define an enclosure configured to receive the aqueous fluid flowing from the flow opening and direct the aqueous fluid through the one or more openings in the sidewalls.

19. The system of claim 15, wherein the insert includes an assembly of a flow impeding member proximate a bottom surface of the grid member and arranged to impede the flow of the aqueous fluid through the one or more of the grid openings sufficient to increase fluid turbulence within the dissolving bowl and a flow redirecting member proximate the top surface of the grid member and arranged to redirect the fluid flowing from the flow opening to flow in one or more directions over the top surface of the grid member, and the flow impeding member and the flow redirecting member are coupled to each other and thereby retained in fixed positions relative to the grid member.

* * * * *